United States Patent
Bergman et al.

(10) Patent No.: US 8,942,275 B2
(45) Date of Patent: Jan. 27, 2015

(54) CONTROLLING UPLINK MULTI-ANTENNA TRANSMISSIONS IN A TELECOMMUNICATION SYSTEM

(75) Inventors: Johan Bergman, Stockholm (SE); Johan Hultell, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 63 days.

(21) Appl. No.: 13/505,768

(22) PCT Filed: Feb. 13, 2012

(86) PCT No.: PCT/SE2012/050144
§ 371 (c)(1),
(2), (4) Date: May 3, 2012

(87) PCT Pub. No.: WO2012/148342
PCT Pub. Date: Nov. 1, 2012

(65) Prior Publication Data
US 2012/0275495 A1    Nov. 1, 2012

Related U.S. Application Data

(60) Provisional application No. 61/480,715, filed on Apr. 29, 2011.

(51) Int. Cl.
*H04B 1/38*    (2006.01)
*H04B 7/06*    (2006.01)
(Continued)

(52) U.S. Cl.
CPC ............ *H04B 7/0652* (2013.01); *H04B 7/0404* (2013.01); *H04B 7/0634* (2013.01);
(Continued)

(58) Field of Classification Search
None
See application file for complete search history.

(56) References Cited

U.S. PATENT DOCUMENTS

| 2006/0198449 A1* | 9/2006 | De Bart et al. ................ 375/260 |
| 2010/0173640 A1* | 7/2010 | Pajukoski et al. ............ 455/450 |

(Continued)

FOREIGN PATENT DOCUMENTS

| EP | 2169845 A1 | 3/2010 |
| WO | 2009002097 A1 | 12/2008 |

OTHER PUBLICATIONS

3rd Generation Partnership Project. "3rd Generation Partnership Project; Technical Specification Group Radio Access Network; Medium Access Control (MAC) Protocol Specification (Release 8)." 3GPP TS 25.321, V8.6.0, Jun. 2009, pp. 1-185, Sophia Antipolis Valbonne, France.

(Continued)

*Primary Examiner* — Leon-Viet Nguyen
(74) *Attorney, Agent, or Firm* — Coats and Bennett, PLLC

(57) ABSTRACT

The disclosure relates to controlling uplink transmissions according to closed loop techniques such as closed loop uplink transmit diversity and uplink multiple-input multiple-output (MIMO). An exemplary method for use in a user equipment (61) configured for multi-antenna transmissions comprises a step of receiving (62), in a downlink channel, pre-coding vector information indicating a pre-coding vector for uplink transmission. The method further comprises a step of determining (63) whether the pre-coding vector indicated by the received pre-coding vector information is reliable or unreliable and steps of applying (64) the pre-coding vector indicated by the received pre-coding vector information for uplink transmission only if the pre-coding vector is determined to be reliable and applying (66) a pre-determined pre-coding vector when the pre-coding vector indicated by the received pre-coding vector information is determined to be unreliable.

16 Claims, 4 Drawing Sheets

(51) Int. Cl.
H04B 7/04 (2006.01)
H04L 25/03 (2006.01)

(52) U.S. Cl.
CPC ............ *H04B7/0639* (2013.01); *H04B 7/0654* (2013.01); *H04B 7/0656* (2013.01); *H04L 25/03343* (2013.01)
USPC ........................... 375/219; 370/267; 370/296

(56) References Cited

U.S. PATENT DOCUMENTS

| | | | | |
|---|---|---|---|---|
| 2010/0183085 | A1* | 7/2010 | Taoka et al. | 375/260 |
| 2012/0051450 | A1* | 3/2012 | Zangi | 375/285 |
| 2012/0057491 | A1* | 3/2012 | Tiirola et al. | 370/252 |
| 2012/0113830 | A1* | 5/2012 | Zhu et al. | 370/252 |

OTHER PUBLICATIONS

3rd Generation Partnership Project. "3rd Generation Partnership Project; Technical Specification Group Radio Access Network; Multiplexing and Channel Coding (FDD) (Release 8)." 3GPP TS 25.212, V8.5.0, Mar. 2009, pp. 1-107, Sophia Antipolis Valbonne, France.

3rd Generation Partnership Project. "3rd Generation Partnership Project; Technical Specification Group Radio Access Network; Physical Channels and Mapping of Transport Channels onto Physical Channels (FDD) (Release 8)." 3GPP TS 25.211, V8.0.0, Mar. 2008, pp. 1-54, Sophia Antipolis Valbonne, France.

3rd Generation Partnership Project. "3rd Generation Partnership Project; Technical Specification Group Radio Access Network; Universal Terrestrial Radio Access (UTRA); Uplink Transmit Diversity for High Speed Packet Access (HSPA) (Release 10)." 3GPP TR 25.863 V10.0.0, Jul. 2010, pp. 1-212, Sophia Antipolis Valbonne, France.

3rd Generation Partnership Project. "Proposed SI on Uplink Transmit Diversity for HSPA." 3GPP Work Item Description, 3GPP TD RP-090987, Sep. 18, 2009, Sohpia Antipolis, France.

* cited by examiner

CONTROLLING UPLINK MULTI-ANTENNA TRANSMISSIONS IN A TELECOMMUNICATION SYSTEM

TECHNICAL FIELD

The embodiments described herein relate to controlling uplink multi-antenna transmissions in a telecommunication system and in particular to methods and devices for closed loop solutions such as closed loop uplink transmit diversity and uplink multiple-input multiple-output (MIMO).

BACKGROUND

There is a continuous development of new generations of mobile communications technologies to cope with increasing requirements of higher data rates, improved efficiency and lower costs. High Speed Downlink Packet Access (HSDPA) and High Speed Uplink Packet Access (HSUPA), together referred to as High Speed Packet Access (HSPA), are mobile communication protocols that were developed to cope with higher data rates than original Wideband Code Division Multiple Access (WCDMA) protocols were capable of. The 3rd Generation Partnership Project (3GPP) is a standards-developing organization that is continuing its work of evolving HSPA and creating new standards that allow for even higher data rates and improved functionality.

In a radio access network implementing HSPA, a user equipment (UE) is wirelessly connected to a base station commonly referred to as a NodeB (NB). A base station is a general term for a radio network node capable of transmitting radio signals to a UE and receiving signals transmitted by a UE.

Recently 3GPP has started a number of work items targeting uplink multi-antenna solutions for a standard release 11. In particular, there are work items targeted for open and closed loop uplink transmit diversity as well as a study item on uplink multiple-input-multiple-output (MMO) transmission.

With uplink transmit diversity, UEs that are equipped with two or more transmit antennas are capable of utilizing all of them for uplink transmissions. This is achieved by multiplying a UE output signal with a set of complex pre-coding weights, a so-called pre-coding vector with one pre-coding weight for each physical transmit antenna. The rationale behind uplink transmit diversity is to adapt the pre-coding weights so that user equipment and network performance is maximized. Depending on UE implementation the antenna pre-coding weights may be associated with different constraints. Within 3GPP two classes of transmit diversity are considered:

Switched antenna transmit diversity, where the UE at any given time-instance transmits from one of its antennas only.

Beamforming where the UE at a given time-instance can transmit from more than one antenna simultaneously. By means of beamforming it is possible to shape an overall antenna beam in the direction of a target receiver. It can be noted that switched antenna transmit diversity can be seen as a special case of beamforming where one of the pre-coding weights is 1 (i.e. switched on) and the pre-coding weight of any other antenna of the UE is 0 (i.e. switched off).

Transmit diversity schemes can be seen as a generic framework for mapping symbols to antenna ports. With respect to beamforming techniques, rank-1 transmissions, the same symbols are mapped to the several physical antennas and by adapting the pre-coding vector so that it matches the "radio" channel the UE and network performance, e.g., coverage, throughput, transmit power, etc., can be improved. More specifically, this is achieved by multiplying the signal with a set of complex weights $w_i$, one for each physical antenna. Mathematically, this can be written as follows $$\begin{bmatrix} y_1 \\ \vdots \\ y_N \end{bmatrix} = \begin{bmatrix} w_1 \\ \vdots \\ w_N \end{bmatrix} s = ws$$

where $y_1$ is the signal at the $l$th antenna port and where $w$ is typically referred to as the pre-coding or beamforming vector. As noted above the fundamental idea with uplink transmit diversity is to exploit the properties in the effective channel and ensure that coherent combining is achieved at the receiver. The term effective channel here incorporates effects of transmit and receive antennas as well as the radio channel between the transmitting and receiving antennas.

For uplink MIMO, different data is transmitted from different virtual antennas in so-called streams. Each virtual antenna corresponds to a different pre-coding vector. Note that closed loop beamforming can be viewed as a special case of uplink MIMO where no data is scheduled on all but one of the possible virtual antennas.

MIMO technology is mainly beneficial in situations where the "composite channel" is strong and has high rank. The term composite channel includes the potential effects of transmit antenna(s), power amplifiers (PAs), as well as the radio channel between the transmitting and receiving antennas. The rank of the composite channel depends on the number of uncorrelated paths between the transmitter and the receiver. Single-stream transmissions, i.e. beamforming techniques, are generally preferred over MIMO transmissions in situations where the rank of the composite channel is low e.g. where there is a limited amount of multi-path propagation and cross polarized antennas are not used, and/or the path gain between the UE and the NodeB is weak.

In closed-loop techniques, such as closed loop transmit diversity or uplink MIMO, the network decides or recommend the pre-coding vector(s) that the UE should apply by means of a physical channel. One example of such a physical channel would be to rely on a Fractional Dedicated Physical Channel (F-DPCH)-like channel or a grant channel, such as an Enhanced Dedicated Channel Absolute Grant Channel (E-AGCH)-like or an Enhanced Dedicated Channel Relative Grant Channel (E-RGCH)-like channel. A serving NodeB could e.g. signal a recommended pre-coding vector to a UE on the physical channel by means of an explicit or implicit indication of the recommended pre-coding vector(s).

The terms "pre-coding vector information", "pre-coding information" and "feedback information" are used synonymously herein to refer to information transmitted on the above mentioned physical channel in order for the network to indicate pre-coding weights/one or several pre-coding vectors that a UE is recommended to use for uplink transmission. Pre-coding vector information that recommends pre-coding vector(s) to a UE may also be referred to as a "pre-coding command". The term "pre-coder" is used herein to refer to a set of pre-coding weights which can comprise one or several pre-coding vectors.

Regardless of the physical channel that is used to signal feedback from the network to the UE one key aspect of closed-loop schemes is that a sufficient reception quality of the feedback quality can be ensured. In fact as the reception quality of the physical channel carrying the feedback information deteriorates the reliability of the signaled pre-coding vector(s) becomes increasingly unreliable and at some point the usage of closed loop beamforming or uplink MIMO may become harmful. This is because the UE will, in case of unreliable pre-coding commands, start to direct its beam in a random direction which may cause excessive amounts of interference in neighboring cells. Moreover, the variations in interference will become more rapid. Also, the performance and Rise-over-Thermal (RoT) utilization may be reduced because the received power from a given UE will experience faster variations due to the rapid changes in the pre-coding weights. Consequently, inner loop power control may be unable to track the channel at low Doppler spreads.

Another design choice related to closed loop transmit diversity schemes and MIMO schemes is the physical channel structure and more specifically which physical channels that should be multiplied with the pre-coding vector. According to an example architecture one of the pilots transmitted on a Dedicated Physical Control Channel (DPCCH) and all of the other physical channels are transmitted using a certain pre-coding vector, often referred to as the primary pre-coding vector. The other pilot transmitted on the other DPCCH is transmitted with another pre-coding vector, which e.g. is orthogonal to the primary pre-coding vector. According to an alternative example architecture the pilots are non-precoded and the pre-coding is only applied to the data related channels. Note that 3GPP is considering an architecture based on pre-coded pilots for closed loop transmit diversity. One of the main benefits with an architecture based on pre-coded DPCCH pilots is that the pre-coding vector that the UE has applied does not need be known by the network. This is because channel estimates used for demodulation can be on the pre-coded DPCCH pilot that is pre-coded in the same way as the data channels.

For closed loop transmit diversity and UL MIMO, it is important that the reception quality of the physical channel carrying the pre-coding information can be maintained at a reasonable level. It is also desirable that the UE does not update its pre-coding vector too frequently, if this is not necessary, because frequent updates may cause excessive interference levels in surrounding cells as well as harm the user performance and RoT utilization efficiency at a NodeB controlling the pre-coding vector generation. Furthermore, too frequent updates of the applied pre-coding vectors will make it harder for the inner loop power control (ILPC) loop to adapt to the effective pre-coded channel, which in general will exhibit larger variations than a raw radio channel if a "random" pre-coder is applied.

Thus there is a desire for schemes that help to avoid harmful situations relating to pre-coding vector updates in communication systems applying closed loop multi-antenna transmission techniques such as closed loop uplink transmit diversity and uplink MIMO.

SUMMARY

It is an object to provide methods and apparatuses that allow for improved control in connection with uplink multi-antenna transmissions.

The above stated object is achieved by means of methods, and apparatuses according to the independent claims.

A first embodiment provides a method for use in a user equipment configured for multi-antenna transmissions in a telecommunication system. The method comprises a step of receiving, in a downlink channel, pre-coding vector information indicating a pre-coding vector for uplink transmission. The method also comprises a step of determining whether the pre-coding vector indicated by the received pre-coding vector information is reliable or unreliable. Furthermore, according to the method, the pre-coding vector indicated by the received pre-coding vector information is applied for uplink transmission only if the pre-coding vector is determined to be reliable. If the pre-coding vector indicated by the received pre-coding vector information is determined to be unreliable a pre-determined pre-coding vector is applied according to the method.

A second embodiment provides a method for use in a base station for controlling user equipments configured for multi-antenna transmissions in a telecommunication system. The method comprises a step of transmitting, on a downlink channel to a user equipment, first pre-coding vector information indicating a first pre-coding vector for uplink transmission and subsequently transmitting, on the downlink channel, second pre-coding vector information indicating a second pre-coding vector for uplink transmission. The method also comprises a step of detecting whether reception quality of the downlink channel is insufficient by monitoring a relative phase difference between a first pilot signal received from the user equipment during a first time interval associated with the first pre-coding vector information and a second pilot signal received from the user equipment during a second time interval associated with the second pre-coding vector information.

A third embodiment provides a user equipment configured for multi-antenna transmissions in a telecommunication system. The user equipment comprises a transceiver circuit and a processing circuit. The processing circuit is configured to receive pre-coding vector information transmitted in a downlink channel, where the pre-coding vector information indicates a pre-coding vector for uplink transmission. The processing circuit is also configured to determine whether the pre-coding vector indicated by the received pre-coding vector information is reliable or unreliable. In addition the processing circuit is configured to apply the pre-coding vector indicated by the received pre-coding vector information for uplink transmission only if the pre-coding vector is determined to be reliable and to apply a pre-determined pre-coding vector when the pre-coding vector indicated by the received pre-coding vector information is determined to be unreliable.

A fourth embodiment provides a base station for controlling user equipments configured for multi-antenna transmissions in a telecommunication system. The base station is configured to transmit, on a downlink channel to a user equipment, first pre-coding vector information indicating a first pre-coding vector for uplink transmission and subsequently transmit, on the downlink channel, second pre-coding vector information indicating a second pre-coding vector for uplink transmission. The base station is also configured to detect whether reception quality of the downlink channel is insufficient by monitoring a relative phase difference between a first pilot signal received from the user equipment during a first time interval associated with the first pre-coding vector information and a second pilot signal received from the user equipment during a second time interval associated with the second pre-coding vector information.

An advantage of some of the embodiments of this disclosure is that smaller variations in intra and inter-cell interference levels may be achieved. This is desirable to ensure efficient RoT utilization. Some embodiments of this disclosure specify a method, advantageously known by both a UE and a base station, which determines which pre-coding vector(s) the UE applies when it cannot decode the pre-coding vector information with a sufficient reliability. By ensuring that the UE does not apply the decoded pre-coding vector if the estimated reception quality of the physical channel carrying the pre-coding information is below a certain quality situations where the UE direct the beam inappropriately and cause undesirably high interference in neighboring cells may be avoided. Thus the performance of the UE may be improved.

A further advantage of some of the embodiments of this disclosure is that reduced changes in the effective channel can be achieved, i.e. the combined changes of the radio channel, antenna gains and the pre-coder may be reduced. This may in turn be beneficial for the inner loop power control.

Another advantage of some of the embodiments of this disclosure it that the base station is enabled to detect that the reception quality of the physical channel carrying the pre-coding vector information is viewed as unreliable by the UE.

Further advantages and features of embodiments of this disclosure will become apparent when reading the following detailed description in conjunction with the drawings.

DETAILED DESCRIPTION

Figure 1:
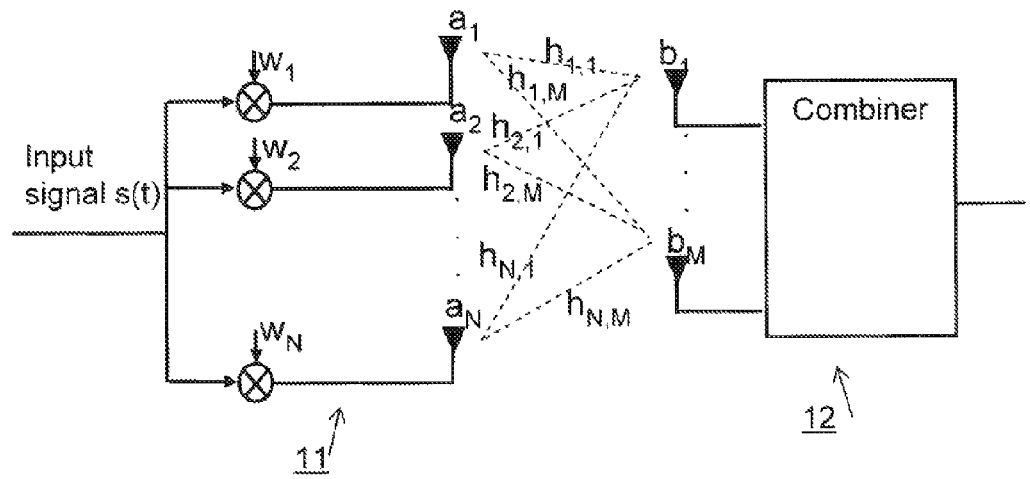
FIG. 1 is a schematic block diagram illustrating an exemplary transmit diversity scheme.

The embodiments of this disclosure will now be described more fully hereinafter with reference to the accompanying drawings, in which different example embodiments are shown. These example embodiments are provided so that this disclosure will be thorough and complete and not for purposes of limitation. In the drawings, like reference signs refer to like elements.

The inventors have realized that there are good reasons for ensuring that the UE does not apply the decoded pre-coding vector if the estimated reception quality of the physical channel carrying the pre-coding information is below a certain quality. Embodiments which will be described in further detail below provide methods and apparatuses enabling a UE to apply a pre-determined pre-coding vector in situations where estimated reception quality of pre-coding information sent from the network is judged unreliable by the UE. The quality estimate could be based on the downlink quality of the physical channel carrying the pre-coding information or of other physical downlink channels than the physical channel carrying the pre-coding information. In one embodiment, the UE always utilizes a fixed, pre-determined pre-coding matrix or vector if the feedback quality is considered as unreliable. In another embodiment the UE applies the most recently received pre-coding vector(s) associated with a sufficient reception quality in periods where the estimated downlink quality is judged as being unreliable. Although most of the embodiments described in detail below are described in a context of closed loop uplink transmit diversity embodiments of this disclosure are applicable to both closed loop uplink transmit diversity schemes and uplink MIMO.

FIG. 1 is a schematic block diagram illustrating an exemplary transmit diversity system in which different embodiments of this disclosure may be implemented. FIG. 1 shows a transmitting unit, such as a UE, comprising physical transmit antennas $a_1, a_2, \ldots, a_N$. An input signal s(t) to be transmitted is mapped to N antenna ports via complex weights $w_1, w_2, \ldots, w_N$ prior to transmission from a respective physical antenna. Note that in the example illustrated in FIG. 1 each antenna port corresponds to a physical transmit antenna. FIG. 1 also illustrates a receiving unit 12, such as a NodeB, comprising receive antennas $b_1, \ldots, b_M$. The composite channel between the transmitting unit and the receiving unit comprises wireless channels $h_{ij}$, where $i=1, \ldots, N$ and $j=1, \ldots, M$, between the different transmit antennas $a_1, a_2, \ldots, a_N$ and receive antennas $b_1, \ldots, b_M$ as illustrated in FIG. 1.

Figure 2:
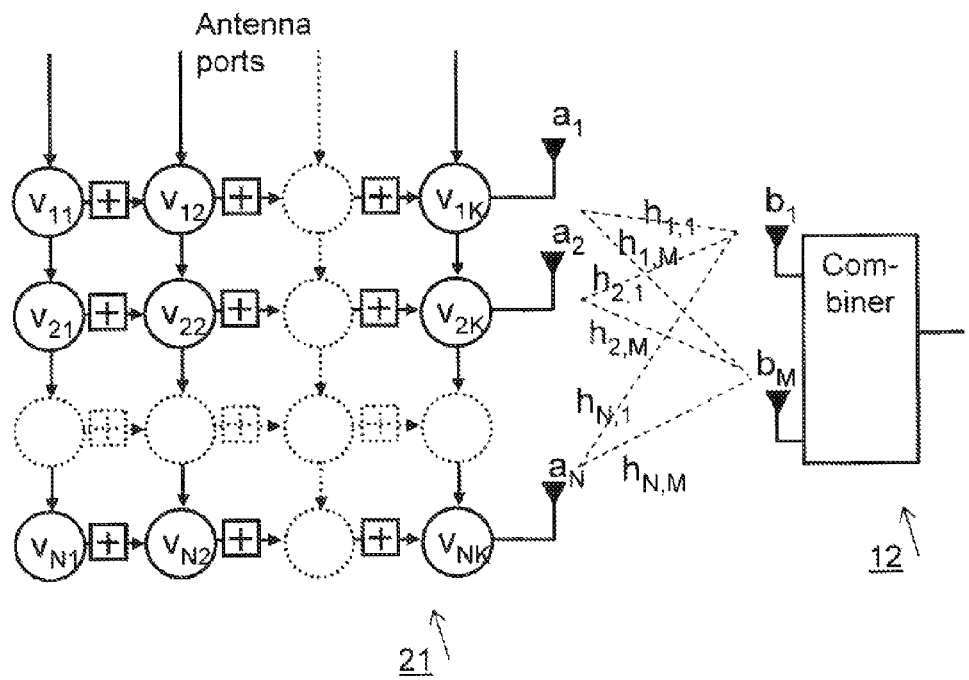
FIG. 2 is a schematic block diagram illustrating mapping of antenna ports to physical antennas.

FIG. 2 is a schematic block diagram illustrating an alternative system in which different embodiments of this disclosure may be implemented. FIG. 2 discloses a transmitting unit 21 such as a UE, comprising physical transmit antennas $a_1, a_2, \ldots, a_N$ and a receiving unit 12, such as a NodeB, comprising receive antennas $b_1, \ldots, b_M$. The composite channel between the transmitting unit and the receiving unit comprising wireless channels $h_{ij}$, where $i=1, \ldots, N$ and $j=1, \ldots, M$, is also illustrated in FIG. 2. In contrast to the transmitting unit 11 of FIG. 1, the transmitting unit 21 of FIG. 2 comprises K antenna ports which are mapped to the N physical antennas as illustrated in FIG. 2.

Figure 3:
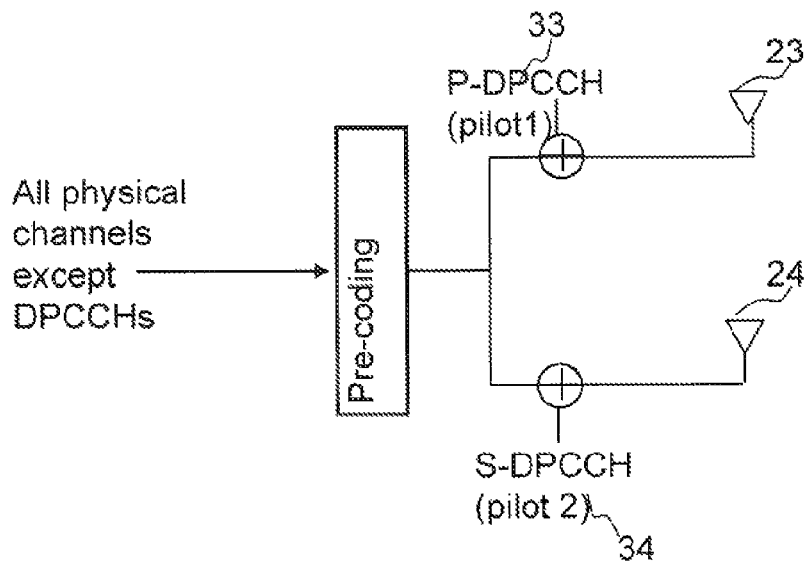
FIG. 3 is a schematic block diagram illustrating an embodiment of a user equipment architecture supporting closed loop beamforming with non-precoded pilots.
Figure 4:
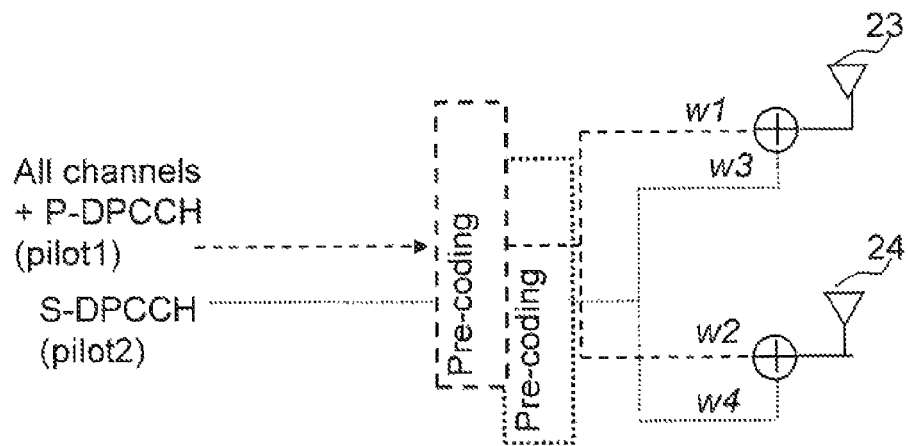
FIG. 4 is a schematic block diagram illustrating an alternative embodiment of a user equipment architecture supporting closed loop beamforming with precoded pilots.

FIGS. 3 and 4 illustrate two possible UE architectures that can support closed loop beamforming. Both FIG. 3 and FIG. 4 illustrate that the UE comprises two physical antennas 23 and 24. FIG. 3 illustrates a structure based on non-precoded (DPCCH) pilots 33 and 34. In the example of FIG. 3 the pre-coding is only applied to the data related channels. FIG. 4 shows a UE architecture with pre-coded pilots. In this structure one of the DPCCH pilots and all of the other physical channels are transmitted using a certain, so-called primary, pre-coding vector and the other DPCCH pilot is transmitted with another, e.g. orthogonal pre-coding vector. As mentioned above, one of the main benefits with an architecture based on pre-coded DPCCH pilots is that the pre-coding vector that the UE has applied does not need be known by the network. This is because the channel estimates used for demodulation can be on the pre-coded DPCCH pilot that is pre-coded in the same way as the data channels; see P-DPCCH in FIG. 4.

Figure 5:
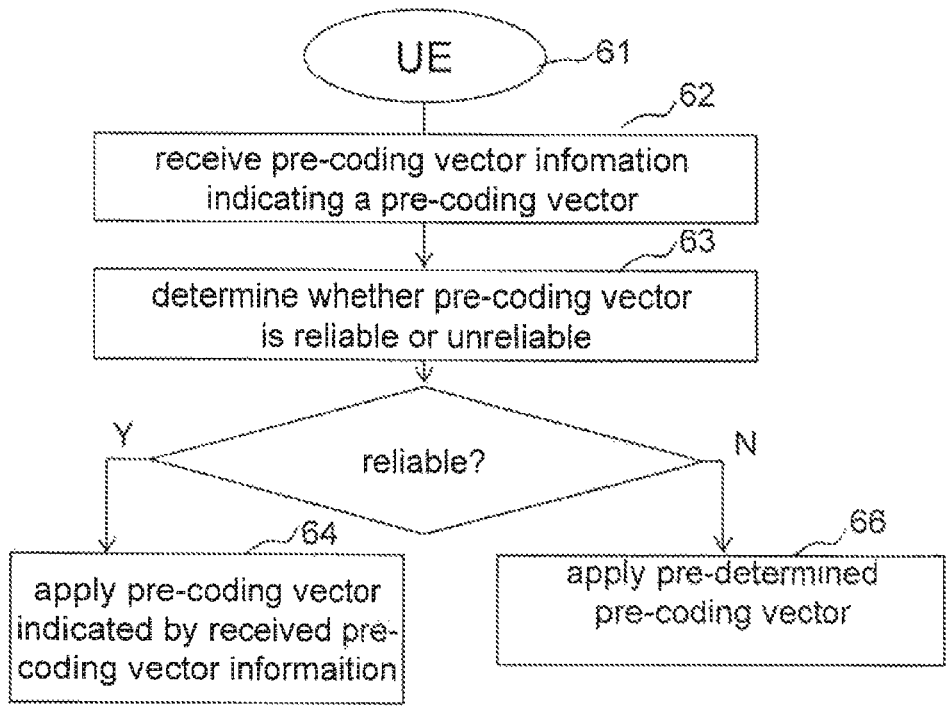
FIG. 5 is a flow diagram illustrating an embodiment of a method for use in a user equipment for controlling uplink multi-antenna transmissions.

FIG. 5 is a flow diagram illustrating an example embodiment of a method for use in a UE 61 configured for multi-antenna transmissions. The method comprises a step 62 of receiving pre-coding vector information indicating a pre-coding vector for uplink transmission. The pre-coding vector information is received in a downlink channel. In a step 62 the UE determines whether the pre-coding vector indicated by the received pre-coding vector information is reliable or unreliable, in other words whether the received pre-coding vector information is reliable such that the pre-coding vector which the UE perceives is indicated by the received pre-coding vector information is the same pre-coding vector that the sender of the pre-coding vector information intended to indicate by means of the pre-coding vector information. If the pre-coding vector is determined to be reliable, the UE applies the pre-coding vector indicated by the received pre-coding vector information for uplink transmission in a step 64. If the pre-coding vector indicated by the received pre-coding vector information is determined to be unreliable, a pre-determined pre-coding vector is applied according to a step 66.

In an example embodiment the UE 61 applies a pre-coder W signaled by the network if the estimated downlink reception quality Qest associated with the pre-coding information is judged as sufficient. For example, if the estimated quality is below a certain quality threshold Q* then the UE does not apply the pre-coder W. Instead, the UE applies a pre-determined pre-coder W0. As long as the estimated quality of the downlink channel and thus the reliability of the pre-coding vector information is judged as being sufficient, in other words Qest is larger or equal than the treshold Q*, the UE applies the pre-coder W signaled by the network.

In an alternative embodiment the UE applies the most recently received pre-coder that has been judged as being reliable. To exemplify, if the UE received pre-coder $W_{t-1}$ at time-instance t-1 and the quality of the physical channel used to signal the pre-coder was judged as being sufficient and the quality of the downlink channel is judged as being unreliable at time t, then the UE will continue to use the pre-coder Wt-1 even though a new, other pre-coder has been decoded. This pre-coder could be applied for a fixed time-duration or until the quality of the received pre-coding information is judged as being reliable again. A benefit of this alternative embodiment is that if the downlink quality associated with the physical channel used by the UE to judge whether the pre-coding information is reliable varies around the quality threshold Q* a flip-flop UE behavior in terms of the applied pre-coder can be avoided.

An advantage common for both embodiments mentioned above is that the UE utilize a pre-determined pre-coding vector in case the pre-coding vector indicated by the pre-coding vector information is determined to be unreliable. The pre-determined pre-coding vector could be applied for a fixed time-duration or until the quality of subsequently received pre-coding vector information is judged as being reliable. Thus if the pre-coding vector information sent on the downlink is judged as being unreliable for a "long" time duration the UE will utilize a constant pre-coding vector during this time-period. This will result in:

Reduced changes in the effective channel, i.e. the combined changes of the radio channel, antenna gains, and the pre-coder. This may in turn be beneficial for the inner loop power control loop.

Smaller variations in intra and inter-cell interference levels. This is desirable to ensure efficient RoT utilization.

Figure 6:
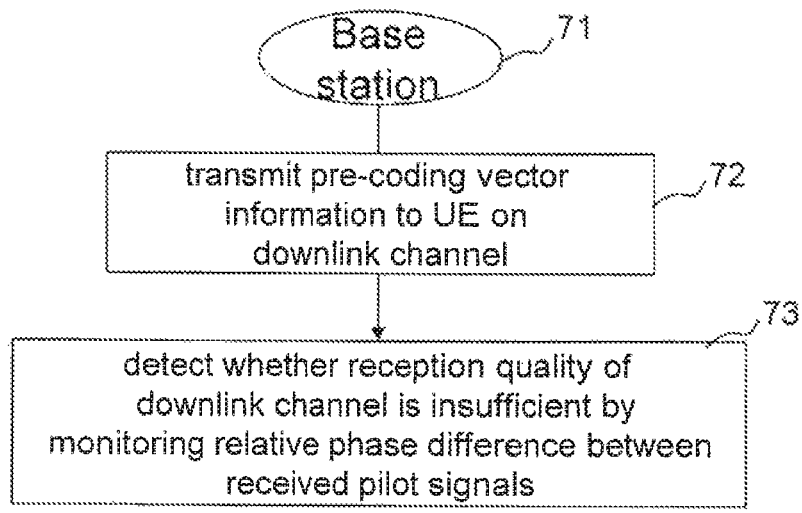
FIG. 6 is a flow diagram illustrating an embodiment of a method for use in a base station controlling user equipments configured for multi-antenna transmissions.

FIG. 6 is a flow diagram illustrating a method for use in a base station 71, e.g. a NodeB, for controlling UEs configured for multi-antenna transmissions. According to a step 72, the base station 71 transmits pre-coding vector information to the UE on a downlink channel. In a step 73 the base station 71 detects whether reception quality of the downlink channel is insufficient by monitoring a relative phase difference between pilot signals received from the UE. To be more concrete, the base station 71 could use the two most recently transmitted pre-coding information commands and the pilots received during the two associated slots (or subframes if the UE update its pre-coding vector on a per subframe basis). By comparing the received pilots during the two time intervals (slots or subframes), the base station 71 can estimate how large the change in relative phase associated with the DPCCHs is and compare this to the relative phase difference of the pre-coding vectors that the base station 71 transmitted. If there is a difference in phase between the pre-coding vectors transmitted by the base station and the base station does not detect any phase difference in the received DPCCHs then this can be used as an indication that the received pre-coding information at the UE is considered as unreliable. If the base station knows that the UE will use a predetermined fixed pre-coding vector if the UE determines that the received pre-coding vector information is reliable, it is possible for the base station to detect that the received pre-coding vector information is considered unreliable by the UE in further ways. If there is no relative phase difference between the pre-coding vectors transmitted by the base station and a phase difference is detected between the received pilots this is also an indication that the received pre-coding information is considered unreliable by the UE since this indicates that the UE used the pre-determined fixed pre-coding vector for uplink transmission.

It may be beneficial for the base station to be aware of when the UE considers the pre-coding vector information unreliable. The base station may be able to increase the transmission power when transmitting the pre-coding vector information in order to increase the reliability. If the base station is unable to increase the transmission power when the UE considers the pre-coding vector information to be unreliable, the base station may instead choose to inactive the uplink multi-antenna transmission. Closed loop transmit diversity (CLTD) may be inactivated by the base station by means of a High Speed Shared Control Channel (HS-SCCH) order to thereby save power. Furthermore, decoding of uplink transmissions at the base station may be improved if the base station knows which pre-coding vector the UE has used for the uplink transmission.

Figure 7:
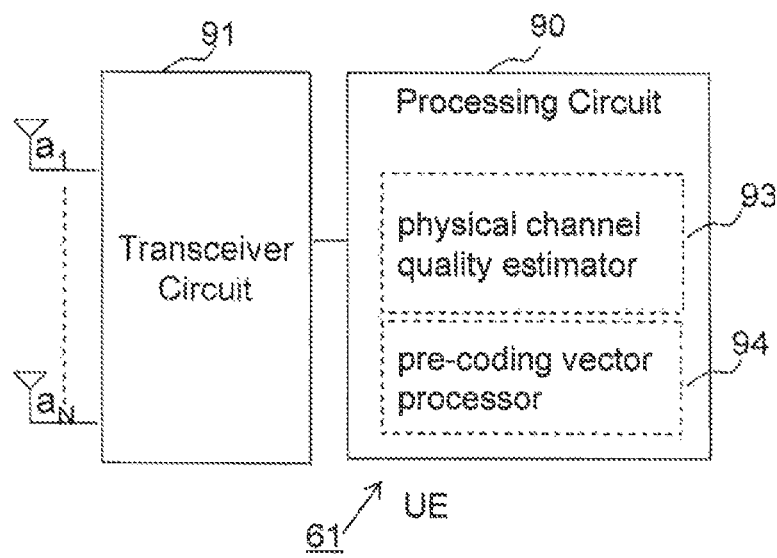
FIG. 7 is a schematic block diagram of an exemplary embodiment of a user equipment.

FIG. 7 illustrates an exemplary UE 61. The UE 61 comprises a transceiver circuit 91 and a processing circuit 90, which may be configured to carry out a method for use in a UE according to any of the embodiments described above. The UE 61 also comprises a plurality of antennas $a_1, \ldots, a_N$ to be able to perform uplink transmissions according to a multi-antenna transmission technique such as closed loop uplink transmit diversity or uplink MIMO. The transceiver circuit 91 comprises any type of wireless transceiver, such as a WCDMA transceiver, Long Term Evolution (LTE) transceiver, or Wireless Local Area Network (WLAN) transceiver. The processing circuit comprises one or more processors, hardware, firmware, or a combination thereof. According to an exemplary embodiment, the processing circuit 90 includes a pre-coder for pre-coding transmitted signals. The processing circuit 90 is configured to receive, from a serving NodeB, a pre-coding vector for a specified transmission interval and configured to determine a reliability of the pre-coding vector. If the processing circuit 90 determines that the pre-coding vector is reliable, it pre-codes a transmit signal for the specified transmission interval using the received pre-coding vector. If the processing circuit 90 determines that the pre-coding vector is not reliable, it pre-codes a transmit signal for the specified transmission interval using a default pre-coding vector or a pre-coding vector for a previous transmission interval that is deemed to be reliable. In some embodiments, the processing circuit 90 determines the reliability of the pre-coding vector based on a quality of a downlink channel. The processing circuit 90 may e.g. be configured to execute software instructions of one or several computer program products to implement different modules, such as exemplary modules 93 and 94 illustrated in FIG. 7. The module 93 is a physical channel quality estimator which is configured to estimate reception quality of a downlink channel to determine if the pre-coding vector indicated by the received pre-coding vector information is reliable or unreliable. The module 94 is a pre-coding vector processor which is configured to apply the pre-coding vector indicated by the pre-coding vector or a predetermined pre-coding vector for uplink transmission depending on whether the pre-coding vector indicated by the pre-coding vector information is determined to be reliable or unreliable.

Figure 8:
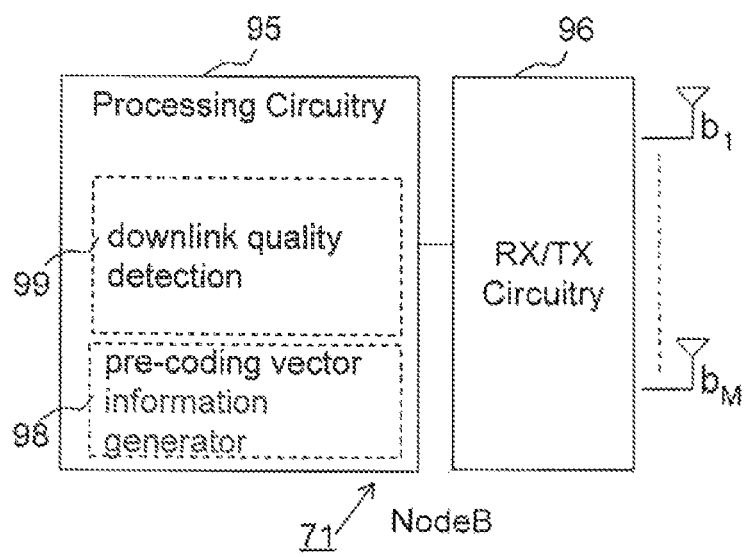
FIG. 8 is a schematic block diagram of an exemplary embodiment of a NodeB.

FIG. 8 illustrates an exemplary embodiment of a base station 71. The base station 71 is a NodeB, which may be configured to interact with the UE 61 illustrated in FIG. 7. The NodeB 71 comprises transceiver circuitry 96 and processing circuitry 95, which e.g. may be configured to carry out the method illustrated in FIG. 6. The NodeB 71 also comprises antennas $b_1, \ldots, b_N$. The transceiver circuitry 96 is configured to transmit pre-coding vector information indicating pre-coding vectors for uplink transmission to UEs 61. The processing circuitry 95 comprises one or more processors, hardware, firmware, or a combination thereof. According to an exemplary embodiment, the processing circuitry 95 is configured to detect whether reception quality of a downlink channel is insufficient by monitoring a relative phase difference between received pilots according to the method step 73 illustrated in FIG. 6 and described above. The processing circuitry 95 may e.g. be configured to execute software instructions of one or several computer program products to implement different modules, such as exemplary modules 98 and 99 illustrated in FIG. 8. The module 98 is a pre-coding vector information generator which is configured to generate the pre-coding vector information to be transmitted to one or several UEs to recommend pre-coding vector(s) for uplink transmission. The module 99 is a module for downlink quality detection which is configured to detect indications that the downlink quality associated with the pre-coding vector information is viewed as unreliable by the UE(s).

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method for use in a user equipment in a telecommunication system, the user equipment configured for multi-antenna transmissions, the method comprising:
    receiving, in a downlink channel, pre-coding vector information indicating a pre-coding vector for uplink transmission;
    determining whether the pre-coding vector indicated by the received pre-coding vector information is reliable or unreliable;
    applying the pre-coding vector indicated by the received pre-coding vector information for uplink transmission only if the pre-coding vector is determined to be reliable;
    applying a second pre-coding vector when the pre-coding vector indicated by the received pre-coding vector information is determined to be unreliable, wherein the second pre-determined pre-coding vector is the most recently received pre-coding vector that has been judged as being reliable.

2. The method of claim 1 wherein the second pre-coding vector is applied for uplink transmission during a fixed time-duration.

3. The method of claim 1 wherein the second pre-coding vector is applied until the quality of subsequently received pre-coding vector information is determined to be reliable.

4. The method of claim 1 wherein the pre-coding vector indicated by the received pre-coding vector information is determined to be unreliable if an estimated quality of the downlink channel used to signal the pre-coding vector information is below a threshold.

5. A method, for use in a base station, of controlling user equipment configured for multi-antenna transmissions in a telecommunication system, the method comprising:
    transmitting, on a downlink channel to a user equipment, first pre-coding vector information indicating a first pre-coding vector for uplink transmission, and subsequently transmitting, on the downlink channel, second pre-coding vector information indicating a second pre-coding vector for uplink transmission;
    determining whether reception quality of the downlink channel is insufficient by monitoring a first relative phase difference between a first pilot signal received from the user equipment during a first time interval associated with the first pre-coding vector information and a second pilot signal received from the user equipment during a second time interval associated with the second pre-coding vector information and by comparing the first relative phase to a second relative phase difference between the first pre-coding vector and the second pre-coding vector.

6. The method of claim 5 wherein the determining comprises determining that insufficient reception quality of the downlink channel exists when there is a relative phase difference between the first and second pre-coding vectors and no phase difference is detected between the received first and second pilot signals.

7. The method of claim 5 wherein the first and second time intervals are time slots.

8. The method of claim 5 wherein the first and second time intervals are subframes.

9. A user equipment configured for multi-antenna transmissions in a telecommunication system, the user equipment comprising:
    a transceiver circuit;
    a processing circuit;
    wherein the processing circuit is configured to:
        receive, in a downlink channel, pre-coding vector information indicating a pre-coding vector for uplink transmission;
        determine whether the pre-coding vector indicated by the received pre-coding vector information is reliable or unreliable;
        apply the pre-coding vector indicated by the received pre-coding vector information for uplink transmission only if the pre-coding vector is determined to be reliable;
        apply the most recently received pre-coding vector that the processing circuit has judged as being reliable as a second pre-coding vector when the pre-coding vector indicated by the received pre-coding vector information is determined to be unreliable.

10. The user equipment of claim 9 wherein the processing circuit is configured to apply the second pre-coding vector for uplink transmission during a fixed time-duration.

11. The user equipment of claim 9 wherein the processing circuit is configured to apply the second pre-coding vector until the quality of subsequently received pre-coding vector information is determined to be reliable.

12. The user equipment of claim 9 wherein the processing circuit is configured to determine that the pre-coding vector indicated by the received pre-coding vector information is unreliable if an estimated quality of the downlink channel used to signal the pre-coding vector information is below a threshold.

13. A base station for controlling user equipment configured for multi-antenna transmissions in a telecommunication system, wherein the base station is configured to:

transmit, on a downlink channel to a user equipment, first pre-coding vector information indicating a first pre-coding vector for uplink transmission and subsequently transmit, on the downlink channel, second pre-coding vector information indicating a second pre-coding vector for uplink transmission;

determine whether reception quality of the downlink channel is insufficient by monitoring a first relative phase difference between a first pilot signal received from the user equipment during a first time interval associated with the first pre-coding vector information and a second pilot signal received from the user equipment during a second time interval associated with the second pre-coding vector information and by comparing the first relative phase difference to a second relative phase difference between the first pre-coding vector and the second pre-coding vector.

14. The base station of claim 13 wherein the base station is configured to determine that insufficient reception quality of the downlink channel exists when there is a relative phase difference between the first and second pre-coding vectors and no phase difference is detected between the received first and second pilot signals.

15. The base station of claim 13 wherein the first and second time intervals are time slots.

16. The base station of claim 13 wherein the first and second time intervals are subframes.

* * * * *